US011130019B2

(12) United States Patent
Yerli

(10) Patent No.: US 11,130,019 B2
(45) Date of Patent: Sep. 28, 2021

(54) SPORTS EVENTS BROADCASTING SYSTEMS AND METHODS

(71) Applicant: THE CALANY Holding S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/387,246

(22) Filed: Apr. 17, 2019

(65) Prior Publication Data

US 2019/0321683 A1  Oct. 24, 2019

Related U.S. Application Data

(60) Provisional application No. 62/660,687, filed on Apr. 20, 2018.

(51) Int. Cl.
*A63B 24/00* (2006.01)
*H04N 5/232* (2006.01)
(Continued)

(52) U.S. Cl.
CPC ..... *A63B 24/0021* (2013.01); *H04N 5/23238* (2013.01); *H04N 21/4223* (2013.01);
(Continued)

(58) Field of Classification Search
None
See application file for complete search history.

(56) References Cited

U.S. PATENT DOCUMENTS 6,449,010 B1 *  9/2002  Tucker .................. A63B 71/06
                                                    348/157
7,733,416 B2 *  6/2010  Gal ....................... H04N 5/2251
                                                    348/373
(Continued)

FOREIGN PATENT DOCUMENTS

CN    103092459 A    5/2013
CN    106716306 A    5/2017
(Continued)

OTHER PUBLICATIONS

Office Action issued in corresponding Chinese Application No. 201910317326.X, filed Apr. 19, 2019, 11 pages.
(Continued)

*Primary Examiner* — Chikaodili E Anyikire
(74) *Attorney, Agent, or Firm* — Christensen O'Connor Johnson Kindness PLLC

(57) ABSTRACT

A system and method for recording and broadcasting motion of a sports ball and individual players includes a sports ball with cameras embedded within for recording trajectory and locomotion, a sensor module for storing video footage and telemetry metadata, and cameras mounted on the sports equipment of individual players. The sensor module includes an Inertia Measuring Unit, a transceiver, a memory, a power source, and a processor, all operatively connected to one another. The sports ball sends data to a wireless data transmission grid mounted under a sports pitch and/or to antennas for transfer to a data processing server which determines a real ball direction thereafter sent to a stadium camera system that generates further 360 degree action-focused broadcasting data. The data is sent to the processing server which processes the raw footage received from the sports ball and individual players to produce clean footage for various applications.

20 Claims, 17 Drawing Sheets

(51) Int. Cl.
*H04N 21/4223* (2011.01)
*H04N 21/81* (2011.01)
*H04N 21/8549* (2011.01)
*A63B 102/18* (2015.01)
*A63B 102/32* (2015.01)

(52) U.S. Cl.
CPC ....... *H04N 21/816* (2013.01); *H04N 21/8549* (2013.01); *A63B 2024/0031* (2013.01); *A63B 2024/0034* (2013.01); *A63B 2102/18* (2015.10); *A63B 2102/32* (2015.10); *A63B 2220/40* (2013.01); *A63B 2220/806* (2013.01); *A63B 2220/808* (2013.01); *A63B 2220/833* (2013.01); *A63B 2225/52* (2013.01); *A63B 2243/007* (2013.01); *A63B 2243/0025* (2013.01); *A63B 2243/0037* (2013.01); *A63B 2243/0054* (2013.01); *A63B 2243/0066* (2013.01); *A63B 2243/0095* (2013.01)

(56) References Cited

U.S. PATENT DOCUMENTS

| | | | |
|---|---|---|---|
| 7,740,551 B2 | 6/2010 | Nurnberg et al. | |
| 8,228,381 B2* | 7/2012 | Accurso | H04N 21/8133 348/157 |
| 8,237,787 B2* | 8/2012 | Hollinger | A63B 43/04 348/82 |
| 8,477,184 B2* | 7/2013 | Hollinger | A63B 43/04 348/82 |
| 8,517,869 B2 | 8/2013 | Steidle | |
| 8,731,239 B2 | 5/2014 | Gefen | |
| 9,144,714 B2* | 9/2015 | Hollinger | H04N 5/2259 |
| 9,219,848 B2* | 12/2015 | Hollinger | H04N 5/23238 |
| 9,237,317 B2* | 1/2016 | Hollinger | H04N 5/2252 |
| 9,687,698 B2* | 6/2017 | Hollinger | H04N 7/181 |
| 9,692,949 B2* | 6/2017 | Hollinger | A63B 24/0021 |
| 10,218,885 B2* | 2/2019 | Hollinger | H04N 5/2256 |
| 2002/0063799 A1 | 5/2002 | Ortiz | A63B 71/06 348/559 |
| 2003/0210329 A1* | 11/2003 | Aagaard | H04N 7/181 348/159 |
| 2004/0032495 A1* | 2/2004 | Ortiz | H04N 5/232 348/157 |
| 2009/0144785 A1* | 6/2009 | Walker | G11B 27/034 725/105 |
| 2009/0189982 A1* | 7/2009 | Tawiah | A63F 13/65 348/157 |
| 2010/0026809 A1* | 2/2010 | Curry | G06K 9/209 348/157 |
| 2011/0218065 A1 | 9/2011 | Cavallaro et al. | |
| 2012/0300079 A1* | 11/2012 | Hale | H04N 5/232 348/157 |
| 2013/0129338 A1 | 5/2013 | Dowell | |
| 2013/0130843 A1* | 5/2013 | Burroughs | A63B 71/0686 473/415 |
| 2013/0165246 A1* | 6/2013 | Jeffery | A63B 69/3623 473/223 |
| 2013/0215229 A1 | 8/2013 | Yerli | |
| 2013/0218542 A1 | 8/2013 | Yerli | |
| 2013/0242105 A1 | 9/2013 | Boyle et al. | |
| 2014/0013361 A1* | 1/2014 | Monari | H04N 5/2252 725/62 |
| 2014/0125806 A1* | 5/2014 | Kemppainen | G11B 27/034 348/157 |
| 2014/0135959 A1* | 5/2014 | Thurman | A63B 69/002 700/91 |
| 2014/0309058 A1* | 10/2014 | San Juan | A63B 69/00 473/422 |
| 2015/0328516 A1 | 11/2015 | Coza et al. | |
| 2015/0373306 A1* | 12/2015 | Flores | H04N 21/6175 348/157 |
| 2016/0099025 A1* | 4/2016 | Anwar | G11B 27/036 386/244 |
| 2016/0249020 A1 | 8/2016 | Mingo | |
| 2017/0251160 A1 | 8/2017 | Dibenedetto et al. | |
| 2017/0262697 A1* | 9/2017 | Kaps | A63F 13/812 |
| 2019/0321683 A1* | 10/2019 | Yerli | H04N 21/4223 |
| 2020/0405395 A1* | 12/2020 | Gullotti | G16H 50/30 |

FOREIGN PATENT DOCUMENTS

| | | |
|---|---|---|
| CN | 107798692 A | 3/2018 |
| EP | 1 928 178 A1 | 6/2008 |
| EP | 2 650 807 A1 | 10/2013 |
| WO | 2012/027799 A1 | 3/2012 |

OTHER PUBLICATIONS

Office Action dated Jan. 12, 2021, in corresponding European Application No. 19 169 578.2, 6 pages.

"See Every Side of the Sports You Love," <https://www.intel.com/content/www/us/en/sports/technology/true-view.html> [retrieved Mar. 28, 2019], 3 pages.

Extended European Search Report dated Jul. 10, 2019, issued in corresponding European Application No. EP 19169578, filed Apr. 16, 2019, 8 pages.

* cited by examiner

SPORTS EVENTS BROADCASTING SYSTEMS AND METHODS

CROSS-REFERENCE(S) TO RELATED APPLICATION(S)

This application claims the benefit of Provisional Application No. 62/660,687, filed Apr. 20, 2018, the disclosure of which is hereby incorporated by reference.

BACKGROUND

The present disclosure generally relates to data broadcasting, and more specifically to a system and method for recording the path of travel and telemetry metadata of a sports ball, sports athletes, or other elements for subsequent processing and broadcasting, enabling various applications and interactions with a user.

When a sporting event is broadcast and televised in real time, many of the most important plays occur in short moments of suspense and excitement. For example, during the broadcast of a soccer game there are numerous instances in which a specific play may be of particular interest to the audience, such as during penalty shootouts, a remarkable save by a goalkeeper, a goal scored from long range, and the like. These plays may typically occur within just a few seconds, time which may be a determining factor of whether a team wins or loses a game that may take more than 3 hours to finish.

Broadcasters typically provide slow motion replays in an attempt to extend and improve a viewer's experience of a match. In order to do this, many different cameras are used to capture numerous shots, angles, and takes; thus, video editors are able to quickly review which angles are most suitable for a given replay, make the necessary video edits, and then broadcast the replay from one or more of the available angles/takes to the audience. However, current broadcasting techniques only allow for capturing moments from different angles with cameras that are fixed in specific parts of the stadium. This can result in a lack of accuracy in keeping track of the ball throughout its trajectory, as well as a lack of flexibility regarding the selection of camera takes.

The mounting of cameras in/on sports balls to record the balls' trajectory has been attempted. However, factors such as high image capture stability/very fast frame rate requirements for post-processing and producing high quality output images have hindered further developments in this field. Although some advances have been made in relation to the monitoring of a sports ball, such as registering and providing data related to the sports ball telemetry, these advances have mostly focused on the impact made by/on an individual sportsperson during the course of an athletic activity. Therefore, these applications have mainly been used as athletic activity assessment tools and not as a method/opportunity to record broadcastable material to an audience.

Hence, there is a definite need for a system and method that enables the recording of images from the perspective of a sports ball or individual players which may then be processed into broadcast quality images for the enjoyment of an audience.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure describes a system and method that allows for recording and broadcasting footage from the perspective of a sports ball, individual players, and locations around a sports field during a sports activity, enabling various interactive applications with users. The system and method may enhance the quality and value of footage broadcast to an audience, eliminating camera mobility restrictions that are a typical drawback of current broadcasting methods and fulfilling fast frame rate requirements for video post-processing. Additionally, the system and method may increase the number of possible sets of camera footage to be broadcast by providing more than one set of processed video footage. The current disclosure also contemplates other applications, such as processing of raw data through a rendering engine to produce virtual reality (VR), augmented reality (AR), and mixed reality (MR) experiences that may be employed in the training of sports players or for the enjoyment of an audience that may view a replay broadcast from different perspectives (e.g., from a sports ball perspective, perspective of individual players, or a global three-dimensional perspective). Other applications may include allowing users, such as members of an audience, to enjoy AR, VR, and MR experiences by creating interactive volumes that may be viewed and engaged by users through AR/VR/MR devices, or enjoying 360 degree action-focused replays that can be viewed in AR/VR/MR views and which may, as well, be shared with other stadiums. In some embodiments, systems and methods of the current disclosure may additionally be adapted for other types of events that may take place in stadiums, such as concerts, plays, and other entertainment events.

According to an embodiment, a broadcasting system includes a wireless transceiver hub (which may include, e.g., a wireless pitch data transmission grid mounted under a sports pitch and/or antennas mounted around the sports pitch) communicatively connected for receiving data from a sports ball and sports equipment on individual players and transmitting such data to a data processing server. Received data includes raw video footage of the sports ball and individual players' trajectory and locomotion as well as sports telemetry metadata of the sports ball. The data is then transferred to a data processing server which analyses the data and generates directional data that is used to control a stadium camera system communicatively connected to the data processing server (e.g., via the wireless transceiver hub). The stadium camera system includes a plurality of action-focused cameras that, based on the received directional data sent by the data processing server, auto-compensate and regulate rotation, focus, and zoom of cameras in order to generate footage data comprising uniform action coverage covering 360 degrees field of view around a spherical focus zone determined by the location of the sports ball, individual players, or combinations thereof. The data is then sent back to the processing server for further processing and synthesizing, e.g., from an original high frame rate of at least 100 frames per second (FPS) to produce a clean footage at a frame rate of at least 24 FPS.

In some embodiments, the plurality of action-focused cameras of the stadium camera system includes Light Detection and Ranging (LIDAR) devices mounted thereon, which may provide precise distance and depth information of action taking place in the sports pitch. In other embodiments, the plurality of action-focused cameras of the stadium camera system includes electroacoustic transducers, including microphones and loudspeakers, which enable the recording and reproduction of sound data originating from the action taking place in the sports stadium.

In some embodiments, the spherical focus zone may comprise a fixed diameter or a variable diameter that may be determined based on the action taking place in the sports field.

In various embodiments, the processed footage may be generated from the perspective of the sports ball, of individual players, of 360 degree action-focused views and sounds ready to be broadcast to an audience, and combinations thereof. In some embodiments, processed footage broadcasting may include image data, 3D geometries, video data, audio data, textual data, haptic data, or a combination thereof.

According to an embodiment, sports equipment wearable by individual players, such as articles of clothing, articles of footwear, or athletic protective equipment, may include image capturing devices mounted upon them in order to capture raw video footage from the perspective of individual players. In addition, the sports equipment may include a sensor module connected to the image capturing devices for capturing individual players' motion telemetry metadata and enable data transfer.

According to an embodiment, the sports ball includes an outer layer enclosing a hollow void, such as in a soccer ball, American football, rugby, basketball, volleyball, and the like. In other embodiments, the sports ball is a non-hollow sports ball and includes a single, solid layer or multiple different layers, such as in a baseball, bowling ball, golf ball, and the like.

According to an embodiment, a sports ball includes one or more image capturing devices mounted in the sports ball for capturing video footage of the trajectory and locomotion of the sports ball, as well as a sensor module for receiving the raw video footage of trajectory and locomotion of said sports ball, generating telemetry metadata of said sports ball, and wirelessly transmitting data (e.g., the raw video footage and telemetry data) to some other device, such as to upload the data to a data processing server via a wireless transceiver hub. The sensor module also may include memory for storing this video footage and telemetry metadata of the sports ball.

According to an embodiment, image capturing devices may be embedded in the sports ball covering in areas that allow for a suitable concealment. For example, in the case of a soccer ball, image capturing devices may be mounted in the black pentagonal patches that typically make-up part of the design of soccer balls. Yet further in this embodiment, the number of cameras mounted on the sports ball may vary according to the design of the sports ball.

According to an embodiment, the image capturing devices include one or more layers of soft protective lens mounted on top of a camera lens for providing damage and shock protection. According to yet another embodiment, the camera lens may be sandwiched between two or more layers of soft protective lens for providing damage and shock protection. The number of protective layers may depend upon the specific material composition and thickness of each layer.

According to an embodiment, the sensor module mounted within the sports ball may include an Inertia Measuring Unit (IMU), a transceiver, a memory, and a power source, all operatively connected to a processor. Generally, the sensor module is configured to receive raw video data taken by the image capturing devices as well as telemetry metadata related to the movement of the sports ball for subsequent processing and broadcasting. Preferably, the transceivers are millimeter-wave (mmW) transceivers. The power source is configured to provide power to the sensor module; the memory may be adapted to store application program instructions and to store sports ball telemetry metadata from the IMU; the IMU, which may include one or more accelerometers and gyroscopes, is configured to measure and report the velocity, acceleration, angular momentum, speed of translation, speed of rotation, and other telemetry metadata of the sports ball; the mmW transceivers may allow the sports ball to receive mmW signals and to send the data back when interacting with digital reality content, and may also enable positional tracking of the sports ball; and the processor may be configured to implement application programs stored in the memory of the sports ball. In certain embodiments the IMU and mmW transceivers may be decoupled (i.e., separate from each other). In other embodiments, the IMU and mmW transceivers may be coupled together, forming one operational component within the sensor module.

According to an embodiment, combining the capabilities of the IMU with the positional tracking provided by the mmW transceivers, may enable sub-centimeter or sub-millimeter positional and orientational tracking, which may increase accuracy when tracking the real-time position and orientation of the sports ball and may improve the general user experience. Tracking of the client devices may be performed employing several techniques known (e.g., time of arrival (TOA), angle of arrival (AOA), visual imaging, radar technology, etc.).

According to an embodiment, a ball charging system employed to charge the power source in sensor module may include a ball charging device where the sports ball may be connected for being powered by inductive charging. Exterior markings on the sports ball may indicate the location of an inductive coil that receives charge from the ball charging device, or may otherwise facilitate optimum orientation of the sports ball for being charged.

According to an embodiment, a wireless pitch data transmission grid mounted under the sports pitch and/or antennas mounted around the sports pitch provide the sports ball with a wireless data connection and may allow the sports ball to upload data for further processing and broadcasting. The wireless pitch data transmission grid and antennas enable different wireless systems communication, including but not limited to millimeter wave (mmW)-based communication or a combination of mmW-based and sub 6 GHz-based communication. In other embodiments, 4G antenna systems may be used as support for the mmW/sub GHz antenna systems. In other embodiments, the antennas may use wireless local area networking (WiFi), preferably, but not limited to, providing data at 16 GHz.

According to an embodiment, a method for processing and synthesizing video footage performed by the data processing server includes the steps of obtaining raw video data from image capturing devices mounted in sports balls and on individual players along with telemetry metadata; determining a real ball direction in world space, sending directional data to a stadium camera system; obtaining 360 degree action-focused broadcast data from the stadium camera system; applying camera footage selection/discarding rules; applying data-broadcast triggering rules; and applying other video footage processing techniques on the data received from the sports ball, from the image capturing devices mounted on the sports equipment of individual players, and from the stadium camera system.

According to an embodiment, a method for determining a real ball direction in world space includes the steps of detecting the movement of a sports ball; determining an initial spatial orientation of the sports ball; determining the sports ball telemetry metadata; and analyzing the data to obtain a real ball direction.

According to an embodiment, a camera footage selection/discarding method within ball space may be performed by the data processing server based on a set of camera footage selection/discarding rules. The camera footage selection/discarding method within ball space may be performed in order to process images sent to the data processing server by each of the image capturing devices mounted in the sports ball via the wireless pitch data transmission grid, selecting only footage that may add value to a final footage to be broadcast to an audience. For example, a soccer ball may send camera footage from all of the cameras to the data processing server while the sports ball is displaced during an athletic activity. Then, a camera footage selection rule may instruct the data processing server to select footage from all cameras complying with that camera footage selection rule, and to discard footage from all cameras compliant with camera footage discarding rules. Camera footage may be selected from one camera for a given set of video frames. Additionally, camera footage may also be selected from more than one camera for a given set of video frames for providing more than one set of processed footage for broadcasting to an audience.

According to an embodiment, the data-broadcast triggering rules are based on and directly linked to events that are specific to the rules of the sports event being broadcast.

According to an embodiment, various other applications for the broadcasting system are contemplated, such as employing the broadcasting system for interactions with a user as an augmented reality (AR), virtual reality (VR) and/or mixed reality (MR) system. In this embodiment, raw data captured by image capturing devices (e.g., mounted in the sports ball and/or on the sports equipment of individual players is transmitted to a data processing server (e.g., a processing/rendering server) after being uploaded via a wireless transceiver hub (e.g., a wireless pitch data transmission grid and/or antennas). Subsequently, the data processing server may analyze and process the raw data received to generate directional data that is then sent to the stadium camera system comprising a plurality of action-focused cameras that, based on directional data sent by the data processing server, auto-compensate and regulate rotation, focus, and zoom of cameras in order to generate footage data comprising uniform action coverage covering 360 degrees field of view around a spherical focus zone determined by the location of the sports ball, individual players, or combinations thereof. The data is sent back to the data processing server which, applying data-broadcast triggering rules, noise filtering methods, and other video processing and rendering techniques, processes the raw data and 360 degree action-focused broadcast data to create context-full scenarios that may be used for AR/VR/MR interactions with individual players or with members of an audience.

In an embodiment of AR/VR/MR experiences provided to individual players, the AR/VR/MR system may be employed not only to train athletic skills of individual players, but also to provide psychological conditioning, such as mentally preparing individual players for a penalty shoo-tout. In an embodiment of AR/VR/MR experiences provided to members of an audience, the AR/VR/MR system may be employed to allow members of an audience to view and experience the broadcast of a replay from the perspective of one or more individual players and/or from the perspective of a sports ball. In an embodiment, the data from the image capturing devices on the sports equipment of individual players are used by the processing/rendering server to create interactive volumes that enable AR/VR/MR experiences. In an embodiment, the compensation and modification of the rotation, focus, and zoom of each of the action-focused cameras within the stadium camera system generates 360 degree action-focused broadcast data that the processing/rendering server processes and renders in order to create 360 degree AR/VR/MR experiences around action taking place in the sports pitch. In some embodiments, the 360 degree AR/VR/MR experiences may be shared with one or more other remote stadiums through a cloud server in order to simulate the sports event taking place in the one or more remote stadiums.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present invention will be apparent from the accompanying drawings and from the detailed description that follows below.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
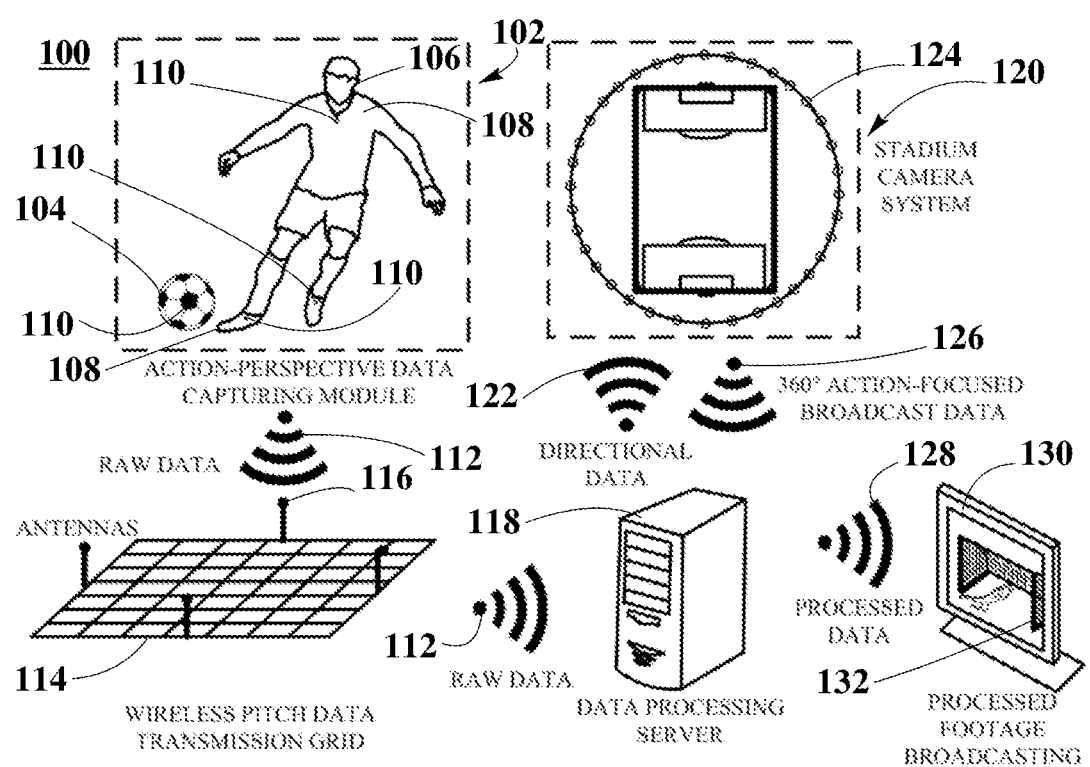
FIG. 1 illustrates a diagram of a broadcasting system, according to an embodiment.

FIG. 1 illustrates a broadcasting system 100, according to an embodiment. The broadcasting system 100 includes an action perspective data capturing module 102 which may comprise a sports ball 104 and one or more individual players 106. Sports equipment 108 on the individual players 106, and the sports ball 104, may include image capturing devices 110 mounted upon them and configured to capture and transmit raw video footage. Additional devices such as a sensor module mounted in the sports ball 104 and on sports equipment 108 on the individual players 106 may capture motion telemetry metadata from the sports ball 104 and from the individual players 106, respectively. The raw data 112 may include raw video footage and telemetry metadata.

Raw data 112, which includes raw video footage captured by the image capturing devices 110 mounted in the sports ball 104 and on individual players 106, in addition to the telemetry metadata captured by the sensor module in the sports ball 104, are transmitted to a wireless transceiver hub, which may include, e.g., a wireless pitch data transmission grid 114 mounted under the sports pitch and/or antennas 116 mounted around the sports pitch, which in turn transmit the raw data 112 to a data processing server 118 for analysis and processing.

After obtaining the raw video data and telemetry metadata, the data processing server 118 may proceed by determining a real ball direction within world space. Information of the real ball direction within world space along with telemetry metadata sent by the sensor module included in the image capturing devices 110 on sports equipment 108 worn by individual players 106 provides a stadium camera system 120 with directional data 122 that action-focused cameras 124 included in the stadium camera system 120 may focus on. The stadium camera system 120 may send real-time 360 degree action-focused broadcast data 126 back to the data processing server 118 for further processing.

In some embodiments, the action-focused cameras 124 include a Light Detection and Ranging (LIDAR) devices mounted thereon. The LIDAR devices may provide precise distance and depth information of action taking place in the sports pitch. Data obtained from the LIDAR devices may be included in the 360 degree action-focused broadcast data 126 that is sent back to the data processing server 118 for further processing.

In some embodiments the plurality of action-focused cameras 124 of the stadium camera system 120 includes electroacoustic transducers, including microphones and loudspeakers, respectively configured to record and reproduce sound data originating from the action taking place on the sports pitch.

Subsequently, the data processing server 118, through footage selection/discarding rules of footage sent by the image capturing devices 110 mounted in the sports ball 104 and on individual players 106, applying data-broadcast triggering rules, noise filtering methods, and other video processing techniques, synthesizes the raw data 112 and 360 degree action-focused broadcast data 126 into processed data 128. A processed data signal is then transmitted for subsequent presentation to an audience, e.g., via display 130. Through the broadcasting system 100, footage from the raw data 112 and 360 degree action-focused broadcast data 126 is received at a high frame rate of at least 100 frames per second (FPS) and is converted into clean, processed data 128 at a low frame rate of at least 24 FPS that may be viewed as a processed footage broadcasting 132 including on a viewing means such as display 130 for enjoyment of an audience. The processed data 128 may be viewed as a reconstructed replay from different angles and perspectives for a specific scene of the sports event.

In some embodiments, processed footage broadcasting 132 may include image data, 3D geometries, video data, textual data, haptic data, audio data, or a combination thereof.

In some embodiments, systems and methods of the current disclosure may additionally be adapted for other types of events that may take place in stadiums, such as concerts, plays, and other entertainment events. For application in concerts and plays, real-time motion-capturing techniques known in the art may be applied to performers.

Figure 2:
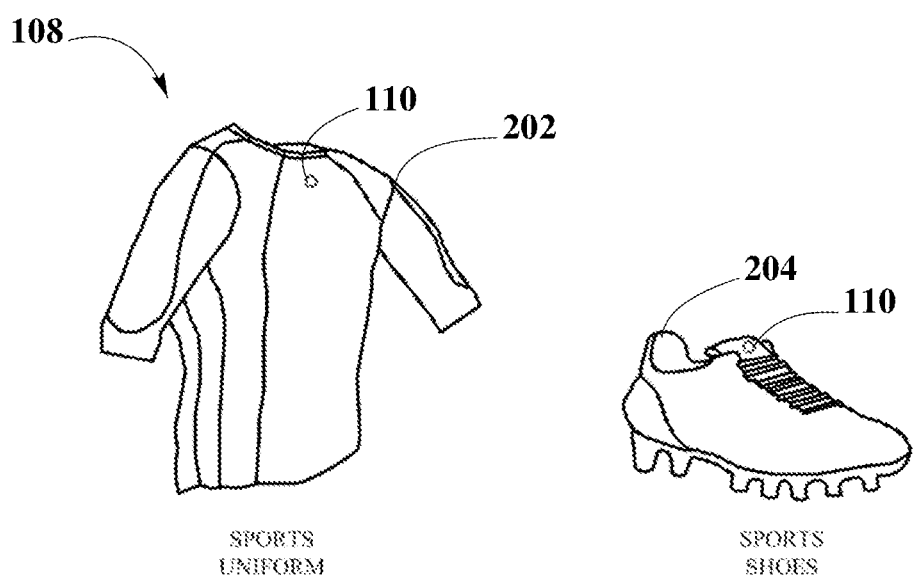
FIG. 2 illustrates sample sports equipment that may be utilized in the broadcasting system, according to an embodiment.

FIG. 2 illustrates sports equipment 108 that may be utilized in the broadcasting system 100, according to an embodiment. In some embodiments of the present disclosure, the piece of sports equipment 108 could be wearable by the individual players, such as an article of clothing, an article of footwear, or athletic protective equipment. In these embodiments, the image capturing devices 110 may be physically coupled to the portion of the body of an individual player by a variety of releasable or non-releasable coupling means such as, for example, straps, adhesives, pockets, clips, or by being integrated into an article of clothing (e.g., shirt, pants, sock, glove, or hat), footwear, or athletic protective equipment worn by the individual player.

In an embodiment, the sports equipment 108 includes sports uniform 202 and sports shoes 204. The image capturing devices 110 that may be mounted upon the sports equipment 108 may preferably include video-recording cameras, and may be employed to record raw video footage from the perspective of the individual players. The video-recording cameras may capture video footage at a high rate of at least 100 FPS and covering at least 120 degrees of field view. The sports equipment 108 additionally includes a sensor module connected to the image capturing devices 110 for capturing individual players motion telemetry metadata and enabling data transfer.

Figures 3A, 3B:
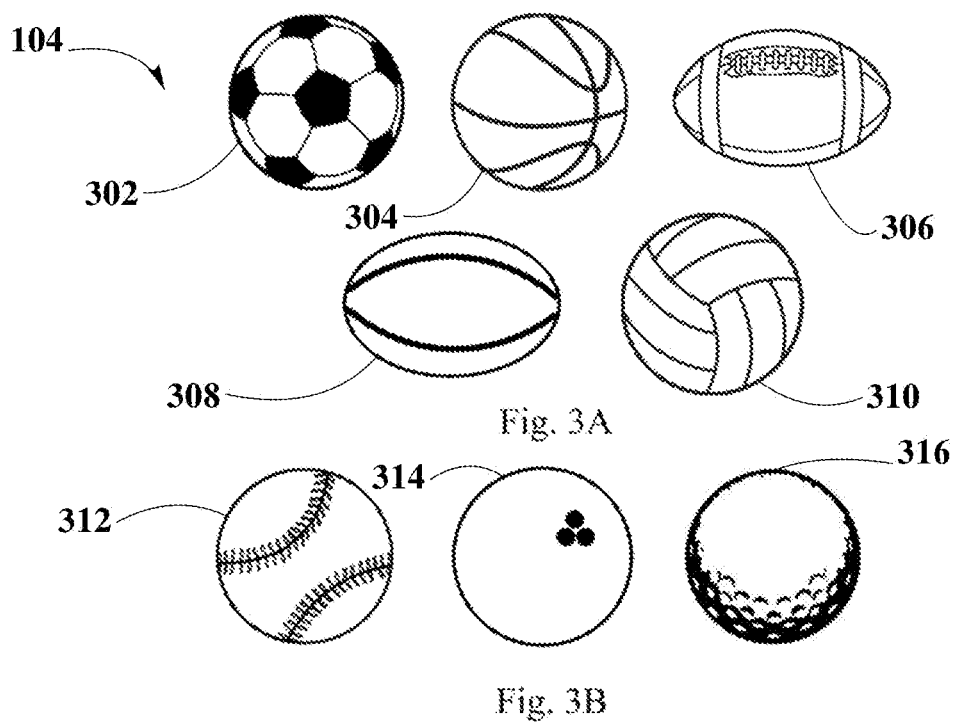
FIGS. 3A and 3B illustrate sample sports balls suitable for being employed in the broadcasting system of the current disclosure, according to an embodiment.

FIGS. 3A and 3B illustrate sports balls 104 that may be suitable for being employed in broadcasting system 100, according to an embodiment.

FIG. 3A shows sports balls 104 including an outer layer enclosing a hollow void, according to an embodiment. Examples of these hollow sports balls 104 include but are not limited to soccer balls 302, basketballs 304, American footballs 306, rugby balls 308, volleyballs 310, and the like. The outer layer may be stitched, bonded, and/or glued together from panels of leather or plastic and laced to allow access to an internal air bladder, if necessary.

FIG. 3B shows non-hollow sports balls 104 including a single solid layer or multiple different layers. Examples of these non-hollow sports balls 104 include but are not limited to baseballs 312, bowling balls 314, golf balls 316, and the like.

Figure 4:
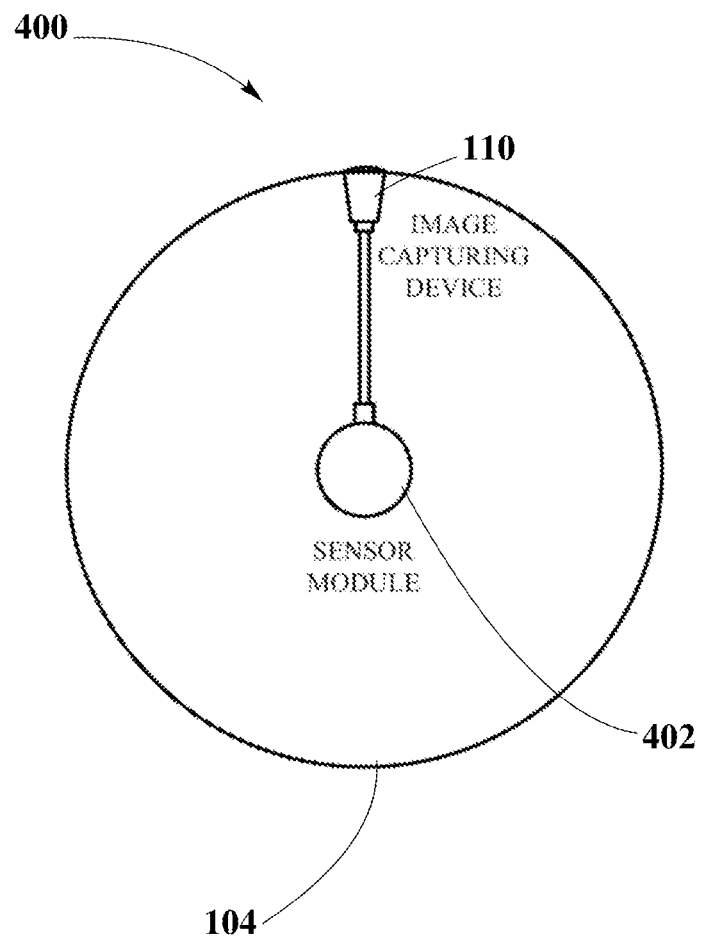
FIG. 4 illustrates a sports ball including one or more image capturing devices and a sensor module for receiving captured video footage of the sports ball trajectory and locomotion as well as generating the sports ball telemetry metadata, respectively, according to an embodiment.

FIG. 4 illustrates a sports ball circuitry 400 including a plurality of image capturing devices 110 for recording video footage of trajectory and locomotion of the sports ball 104, and a sensor module 402 for receiving video footage of captured by image capture devices 110 of the sports ball, generating telemetry metadata of the sports ball, and wirelessly transmitting data (e.g., raw video footage and telemetry data) to some other device, such as to a wireless transceiver hub for upload to a data processing server. The sensor module 402 also may include memory for storing and/or processing this video footage in addition to motion telemetry metadata of the sports ball 104, according to an embodiment. Internal circuitry and a framework enable a suitable connection between the image capturing device 110 and the sensor module 402.

The sensor module 402 may be physically coupled to the sports ball 104 by a variety of coupling means depending on the nature of the sports ball 104. For example, the sensor module 402 may be physically coupled to a sports ball 104 by being attached to the exterior of the sports ball 104, by being attached to an interior surface of a hollow sports ball 104, by being suspended by a suspension system in the interior of a hollow sports ball 104, or by being integrated into the outer layer or other layer of a multi-layer, non-hollow sports ball 104.

Exemplary techniques that may be employed to mount the sensor module 402 to the sports ball 104 are disclosed in U.S. Pat. Nos. 7,740,551, and 8,517,869, both filed on Nov. 18, 2009 and which are incorporated herein by reference.

Figure 5:
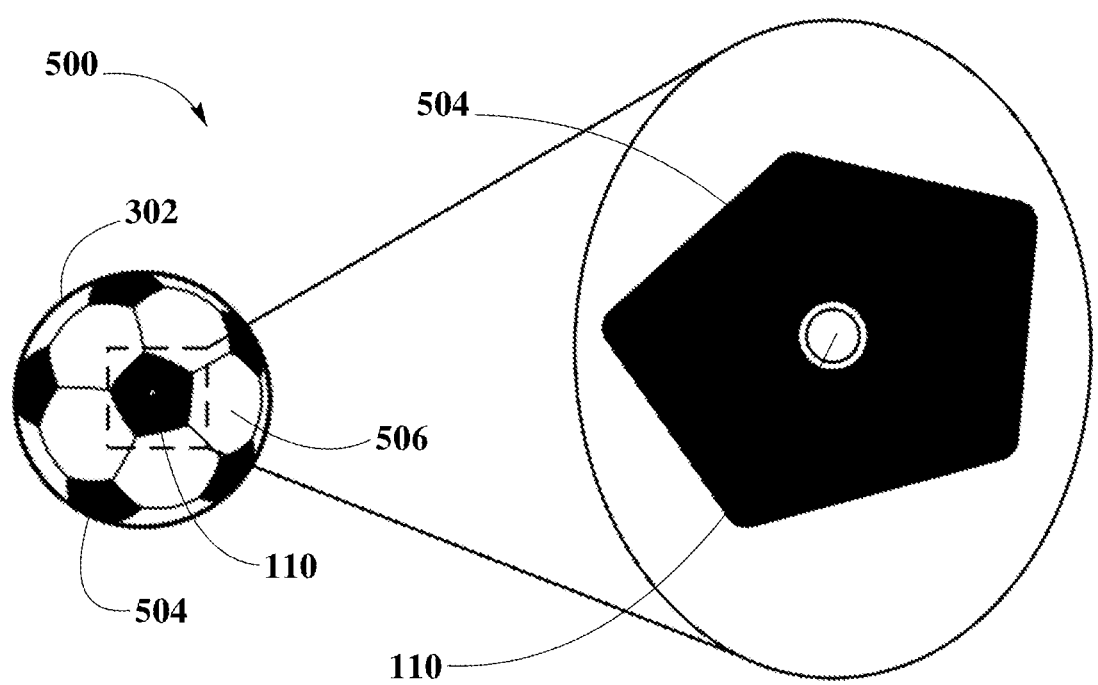
FIG. 5 illustrates a close-up view of an image capturing device mounted in the sports ball, according to an embodiment.

FIG. 5 illustrates a close-up view 500 of an image capturing device 110 mounted in a soccer ball 302, according to an embodiment. The image capturing device 110 may be embedded in the ball covering in areas that allow for a suitable concealment. For example, the plurality of image capturing devices 110 may be mounted in the black pentagonal patches 504 that typically make-up part of the design of soccer balls 302, thus avoiding users noticing the presence of the image capturing devices 110.

The number of image capturing devices 110 may vary according to the design of the sports ball. Thus, in the case of a soccer ball 302 with 12 black pentagonal patches 504 and 20 white pentagonal patches 506, a total of 12 image capturing devices 110 may be mounted in the sports ball, with one image capturing device 110 mounted per black pentagonal patch 504. The image capturing devices 110 may capture video footage at a high rate of at least 100 FPS and covering at least 90 degrees of field view each. Thus, for a soccer ball 302 with 12 image capturing devices 110, a total of at least 1080 degrees of field view may be covered.

Figure 6:
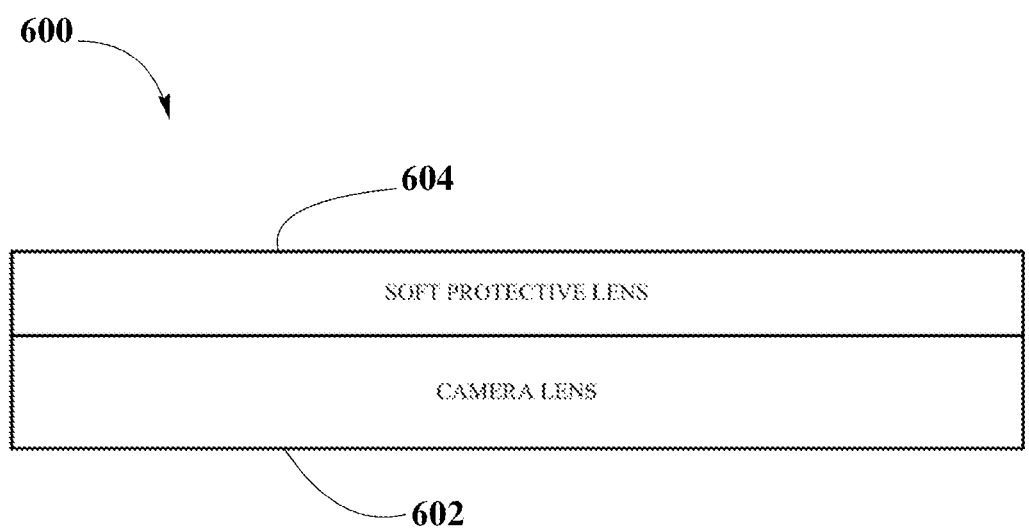
FIG. 6 illustrates image capturing device protective layers, according to an embodiment.

FIG. 6 illustrates image capturing device protective layers 600, according to an embodiment. A camera lens 602 of image capturing device may be protected by one or more layers of soft protective lens 604 mounted on top of the camera lens 602. According to yet another embodiment, the camera lens 602 may be sandwiched between two or more layers of soft protective lens 604 for providing damage and shock protection to the camera lens 602. The number of protective layers may depend on the specific polymer material composition and thickness of layer of soft protective lens 604.

Suitable materials for soft protective lens 604 may include neoprene, which displays high elasticity and cannot easily be cracked or damaged upon impact.

According to yet other embodiments, other suitable methods for protecting a image capturing device may be employed. For example, suitable methods for protecting an image capturing device are mentioned in the United States Pre-Grant Publication No. 2013/0129338, filed on Oct. 15, 2012, which is herein incorporated by reference, where a camera protection system includes three layers of protective material. The outer layer is made of a firm yet flexible material such as Santoprene™ vinyl (Santoprene is a trademark of the ExxonMobil Corporation for their proprietary line of thermoplastic vulcanizate (TPV)), vinyl or nitrile based compound. The second inner layer is made of a softer material such as neoprene or other similar soft and spongy/foam materials that have good compression and decompression properties. The third interior layer is made of Jersey or other suitable soft cloth material designed to protect the finish of a lens barrel wherein the camera lens may be located.

Figure 7:
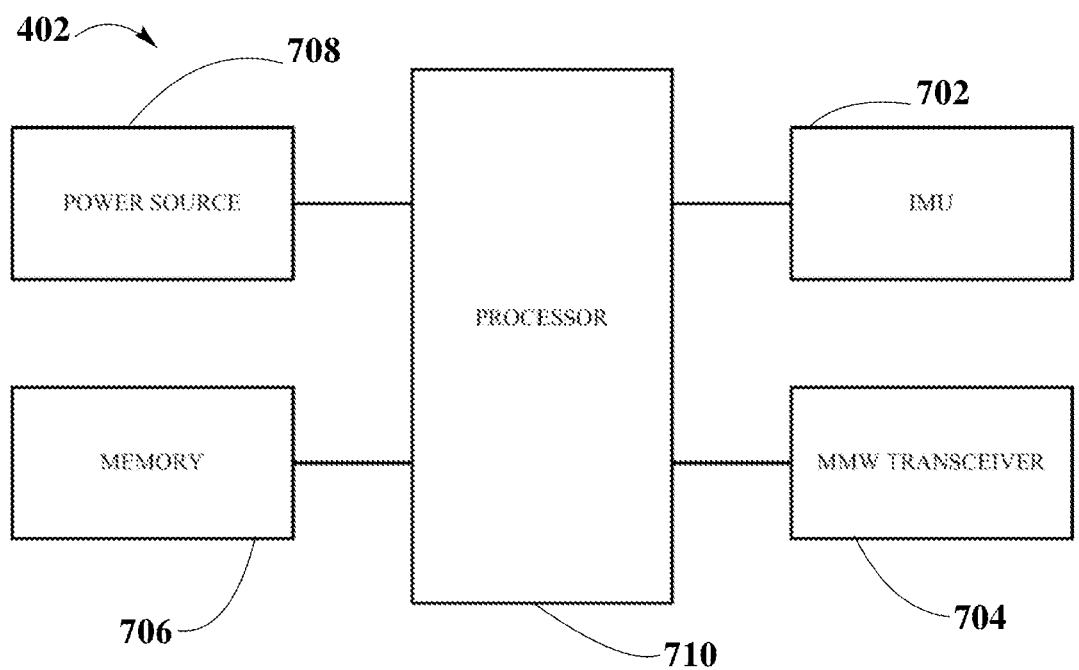
FIG. 7 illustrates a sensor module mounted within the sports ball, according to an embodiment.

FIG. 7 illustrates a sensor module 402 mounted in the sports ball and on sports equipment on individual players, according to an embodiment. The sensor module 402 includes an Inertia Measuring Unit 702 (IMU), transceivers 704, a memory 706, and a power source 708, all operatively connected to a processor 710. Preferably, and as shown in FIG. 7, the transceivers 704 may be mmW transceivers 704. In other embodiments, one or more of the sensor module 402 components may be omitted, or one or more additional components may be added. Generally, the sensor module 402 is configured to receive raw video data taken by the image capturing devices as well as telemetry metadata related to movement of the sports ball and, optionally, individual players for subsequent processing and broadcasting.

The IMU 702 measures and reports the velocity, acceleration, angular momentum, and other telemetry metadata of the sports ball and/or individual players using a combination of accelerometers and gyroscopes.

Accelerometers within the IMU 702 may be capable of measuring the acceleration of the sports ball and individual players, including the acceleration due to the Earth's gravitational field. In one embodiment, accelerometers within the IMU 702 may include a tri-axial accelerometer that is capable of measuring acceleration in three orthogonal directions. In other embodiments one, two, three, or more separate accelerometers may be included within IMU 702.

Gyroscopes included in the IMU 702 or in addition to gyroscopes included in the IMU 702, apart from measuring angular momentum of a sports ball in motion, may also serve for maintaining the rotation of the sensor module 402 independent of the rotation of the sports ball.

MmW transceivers 704 may allow the sports ball and sports equipment on individual players to receive mmW wireless signals and to upload data including raw video footage and telemetry metadata for subsequent processing and broadcasting. The mmW transceivers 704 may also be configured to enable positional tracking of the sports ball and sports equipment. Data transfer and receiving of the mmW transceiver 704 to and from other devices may take place over a personal area network or local area network using, for example, one or more of the following protocols: ANT, ANT+ by Dynastream Innovations, Bluetooth, Bluetooth Low Energy Technology, BlueRobin, or suitable wireless personal or local area network protocols.

In an embodiment, mmW-based communication systems, a combination of mmW-based and sub 6 GHz-based communication, or wireless local area networking (WiFi), preferably, but not limited to, providing data at 16 GHz, are used for data transfer and receiving by mmW transceivers 704. In other embodiments, 4G antenna systems may be used as support the mmW/sub GHz antenna systems.

The memory 706 may be adapted to store application program instructions and to store telemetry metadata of the sports ball and individual players from the IMU 702 as well as raw footage taken by the image capturing device.

The power source 708 is configured to provide power to the image capturing device and to the sensor module 402.

In one embodiment, the power source 708 may be a battery. The power source 708 may be built into the sensor module 402 or removable from the sensor module 402, and may be rechargeable or non-rechargeable. In one embodiment, the sensor module 402 may be repowered by replacing one power source 708 with another power source 708. In another embodiment, the power source 708 may be recharged by a cable attached to a charging source, such as a universal serial bus ("USB"), FireWire, Ethernet, Thunderbolt, or headphone cable, attached to a personal computer. In yet another embodiment, the power source 708 may be recharged by inductive charging, wherein an electromagnetic field is used to transfer energy from an inductive charger to the power source 708 when the two are brought in close proximity, but need not be plugged into one another via a cable. In another embodiment, a docking station may be used to facilitate charging.

The processor 710 may be adapted to implement application programs stored in the memory 706 of the sensor module 402. The processor 710 may also be capable of implementing analog or digital signal processing algorithms such as raw data reduction or filtering. For example, the processor 710 may be configured to receive and process raw data from the IMU 702 and raw video footage from image capturing device.

In an embodiment, combining the capabilities of the IMU 702 with the positional tracking provided by the mmW transceivers 704 may enable sub-centimeter or sub-millimeter positional and orientational tracking, which may increase accuracy when tracking the real-time position and orientation of the client devices and may improve the general user experience.

Tracking of the client devices may be performed employing several techniques known in the art. For example, tracking may be performed by employing time of arrival (TOA) tracking technique, which uses information gathered from three or more antennas. The client device then sends out a signal that is received by all of the antennas within range. Then, each antenna measures the amount of time it has taken to receive the signal from the time the signal was sent, triangulating the position of the client device. In other embodiments, tracking of client devices may be performed by using an angle of arrival (AOA) technique which, instead of using the time it takes for a signal to reach three base stations like TOA does, uses the angle at which a client device signal arrives at the antennas. By comparing the angle-of-arrival data among multiple antennas (at least three), the relative location of a client device can be triangulated. In further embodiments, other tracking techniques known in the art may be employed (e.g., visual imaging, radar technology, etc.).

Figure 8:
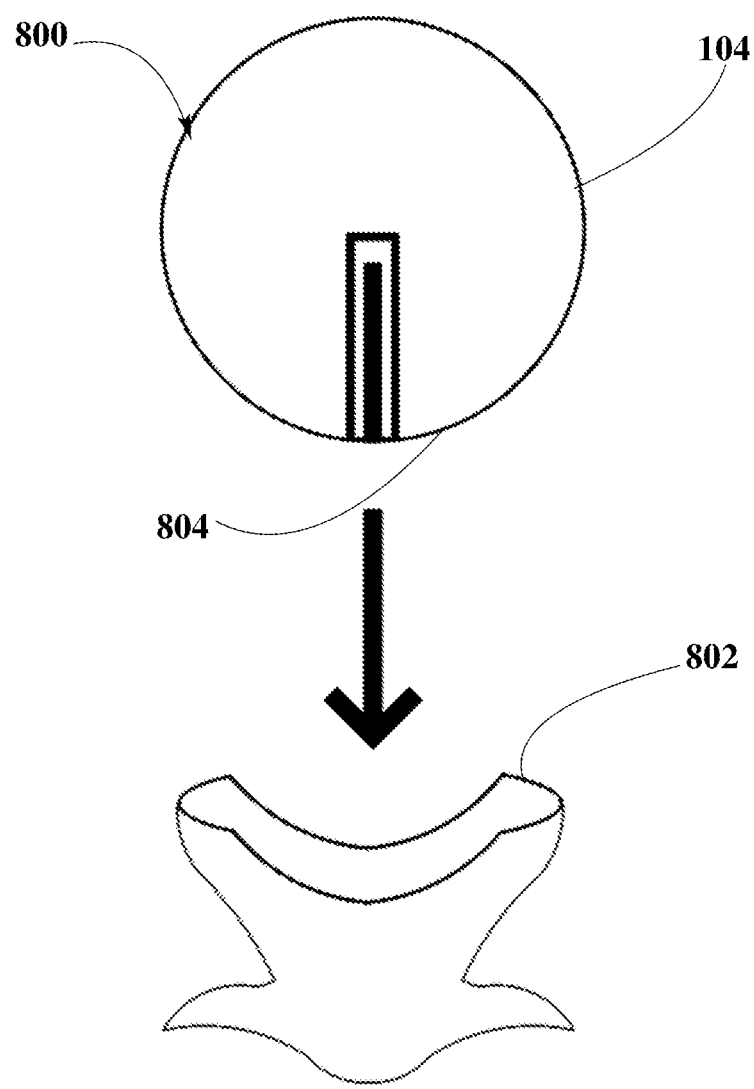
FIG. 8 illustrates a ball charging system that may be employed to charge a power source within the sensor module of the sports ball, according to an embodiment.

FIG. 8 illustrates a ball charging system 800 that may be employed to charge the power source in sensor module, according to an embodiment.

According to an embodiment, the ball charging system 800 may provide power through inductive charging, in which case an inductive coil may be mounted in the sports ball 104 and coupled to the power source 708 of sensor module 402 for charging with a ball charging device 802. The sports ball 104 may have exterior markings 804 to indicate the location of the inductive coil or to otherwise facilitate optimum orientation of the sports ball 104 for charging with the ball charging device 802.

Figure 9:
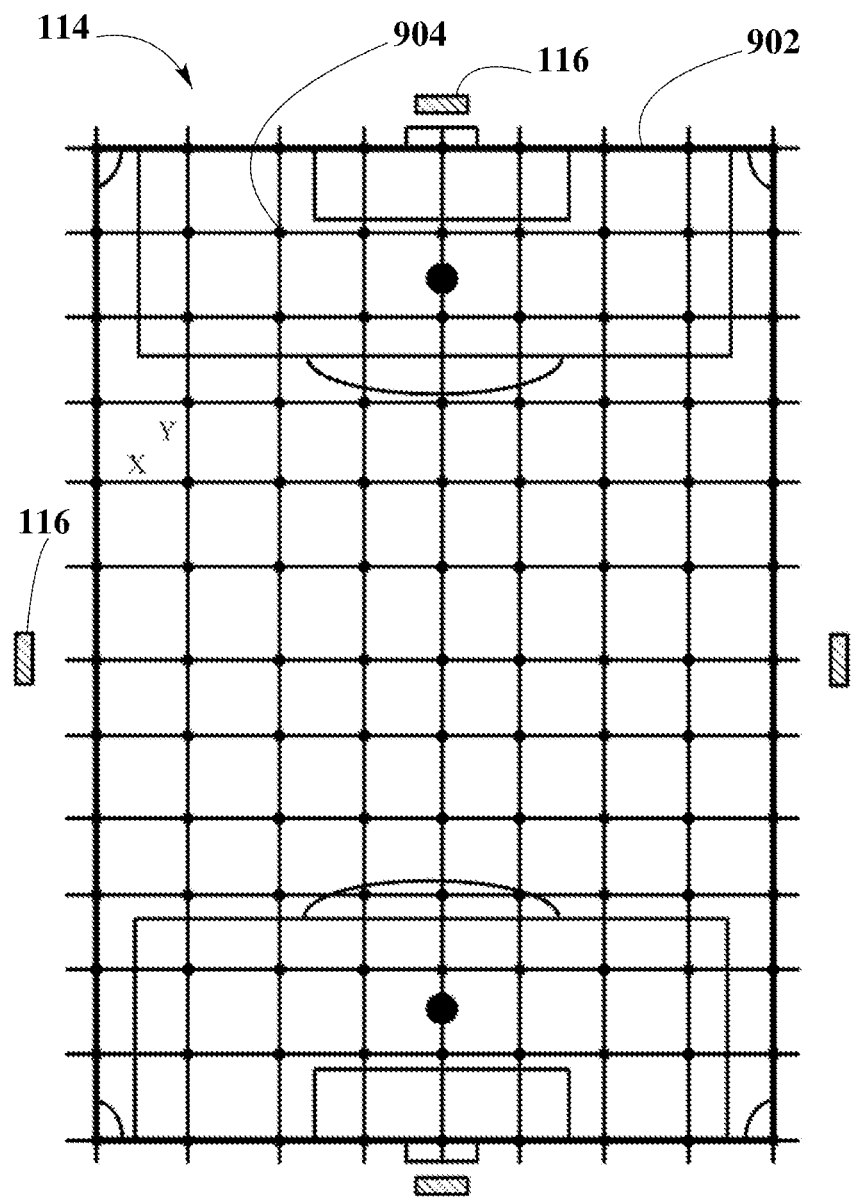
FIG. 9 illustrates a wireless pitch data transmission grid that may be mounted under the sports pitch, according to an embodiment.

FIG. 9 illustrates a wireless pitch data transmission grid 114 mounted under the sports pitch 902, which may be used to provide the sports ball 104 with a wireless data connection and allow the sports ball 104 to upload data for further processing and broadcasting, according to an embodiment. The wireless pitch data transmission grid 114 may include different data transmission/reception nodes 904 positioned at a distance of around 2 meters separating each in both the longitudinal (X) and latitudinal (Y) axes. Each data transmission/reception node 904 in the wireless pitch data transmission grid 114 may include transceivers for enabling wireless data transmission.

According to other embodiments, a combination of wireless pitch data transmission grid 114 and antennas 116 may also be implemented for providing enhanced connectivity and ensure data upload. The antennas 116 may be mounted around the sports pitch 902.

According to yet other embodiments, antennas 116 may be employed in place of the wireless pitch data transmission grid 114.

The wireless pitch data transmission grid 114 and antennas 116 enable different wireless systems communication, preferably mmW-based communication, a combination of mmW-based and sub 6 GHz-based communication, or wireless local area networking (WiFi), preferably, but not limited to, providing data at 16 GHz.

Transmission speed from the sports ball 104 to the wireless pitch data transmission grid 114 and/or to the antennas 116 may be of at least around 5 gigabytes per second.

Figure 10:
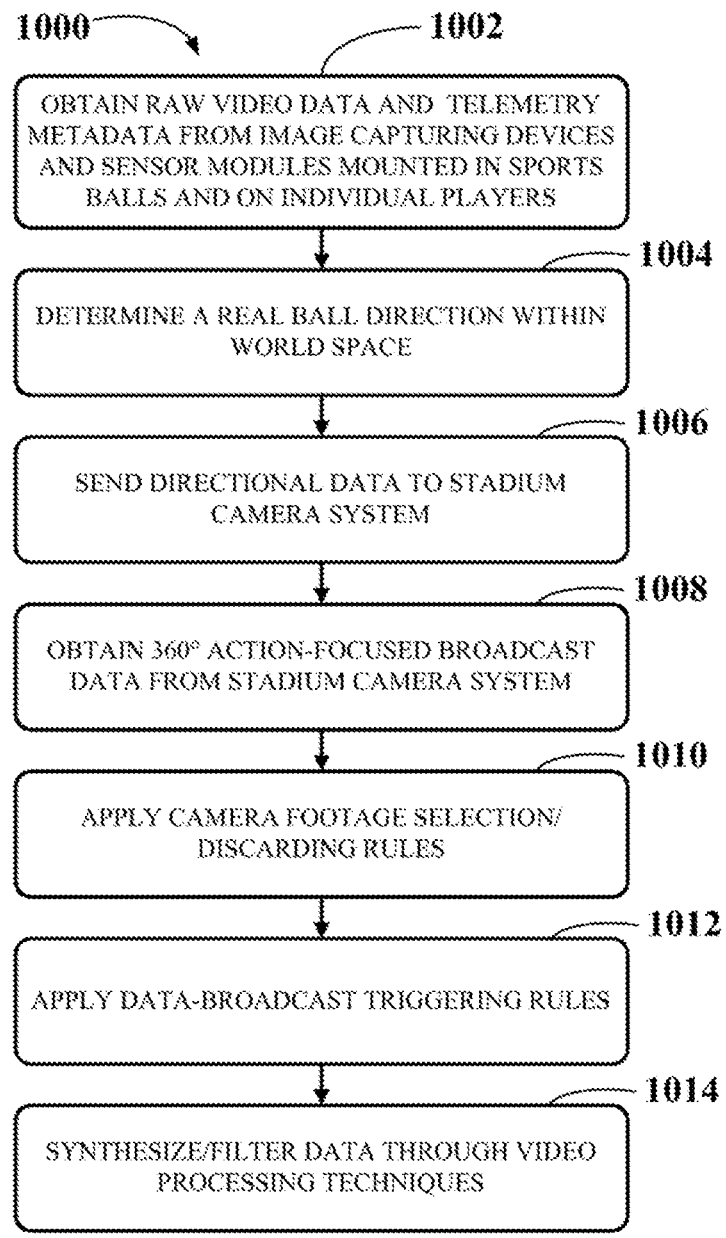
FIG. 10 illustrates a method for processing and synthesizing video footage, according to an embodiment.

FIG. 10 illustrates a method for processing and synthesizing video footage 1000 performed by the data processing server, according to an embodiment. The method for processing and synthesizing video footage 1000 may start by obtaining raw video data and telemetry metadata from image capturing devices mounted in sports balls and/or on individual players at step 1002. The method may continue by determining a real ball direction in world space at step 1004, sending directional data to stadium camera system at step 1006, obtaining 360° action-focused broadcast data from stadium camera system at step 1008, applying camera footage selection/discarding rules at step 1010, applying data-broadcast triggering rules at step 1012, and processing raw data (e.g., synthesizing/filtering) through other video processing techniques at step 1014 to reconstruct scenes for presentation to an audience.

The step of processing raw data through other video processing techniques 1014 may include synthesizing/filtering raw data 112 coming from image capturing devices 110 mounted in the sports ball 104 and on the sports equipment 108 of individual players 106, as well as 360° action-focused broadcast data from the stadium camera system.

Figure 11:
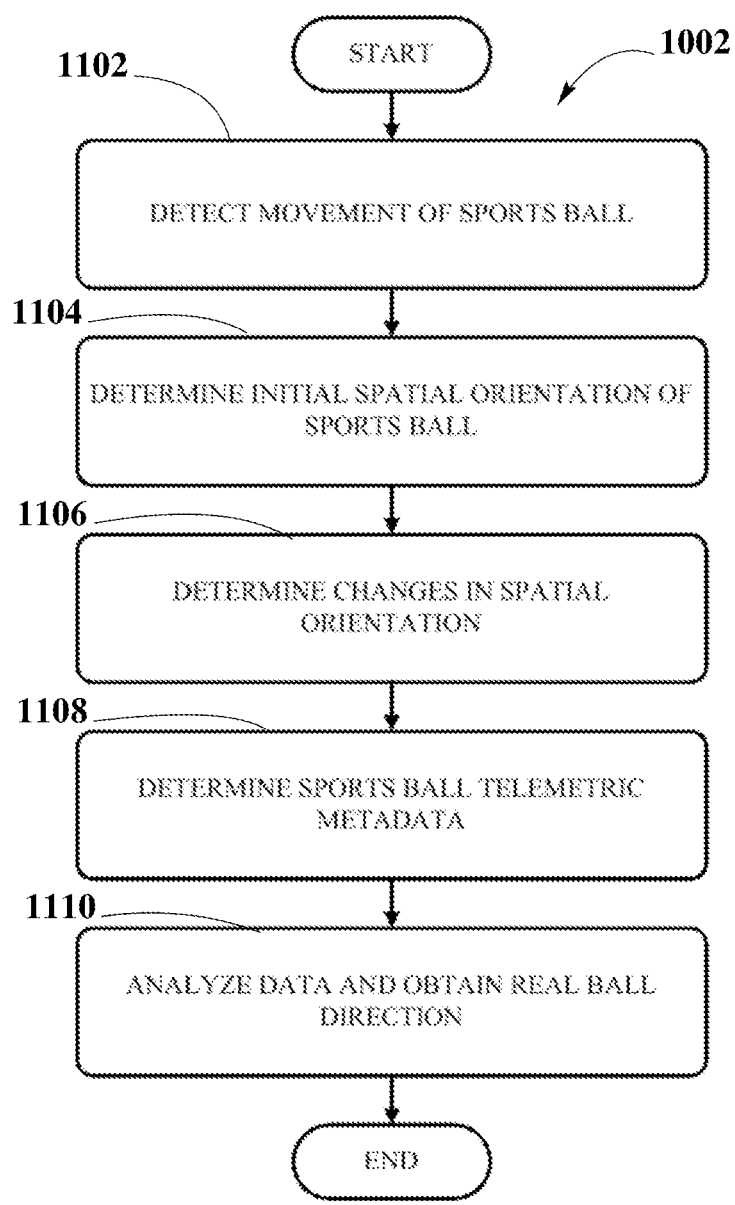
FIG. 11 illustrates a method for determining a real ball direction within world space, according to an embodiment.

FIG. 11 illustrates a method for determining a real ball direction in world space 1002, according to an embodiment. Data obtained by the method for determining a real ball direction in world space 1002 may be combined with a set of camera footage selection/discarding rules, video filtering, and other video processing techniques for ultimately broadcasting footage from the perspective of a sports ball 104. "World space" as used herein refers to any physical area outside of the sports ball where the sports ball may travel during an athletic activity.

The method for determining a real ball direction in world space 1002 may begin by detecting the movement of the sports ball at step 1102, which may be performed based on acceleration data captured by IMU 702 of the sensor module 402 described in FIG. 7. In the case of a soccer ball, for example, the detected movement may include the soccer ball rolling on the ground or flying in the air as a result of being kicked by a player.

Subsequently, and in response to the determination of the occurrence of a movement to track, an initial space orientation of the sports ball may be determined at step 1104, which may be made by reference to a coordinate axis system. The determination of the initial spatial orientation of the sports ball at step 1104 may be made with respect to a gravity vector or with respect to an Earth magnetic field vector. In the case of a soccer ball, the determination of the initial spatial orientation of the sports ball relative to the specific movement to be tracked may be defined, for example, as the spatial orientation of the soccer ball just before, at the moment of, or just after the soccer ball is kicked by an individual, depending on the algorithm employed.

Afterwards, a change in the spatial orientation may be determined at step 1106 in a similar way as the determination of an initial space orientation of the sports ball at step 1104, except that additional information about changes in the orientation of the gravity vector or magnetic field may be additionally factored in.

Then, a determination of the sports ball telemetry metadata at step 1108 may be performed. Telemetry metadata may refer to ball speed, ball spin rate, ball spin axis, and ball launch angle data, all being information captured by the IMU or inferred by the data processing server from data captured by the IMU. Telemetry metadata, in conjunction with high speed video footage taken by image capturing devices from the image capturing device, the initial spatial orientation, and the changes in spatial orientation of the sports ball, may be analyzed by the data processing server to obtain a real ball direction in world space at step 1110. Suitable analysis techniques for obtaining a real ball direction in world space include regression analysis, amongst others.

Figure 12:
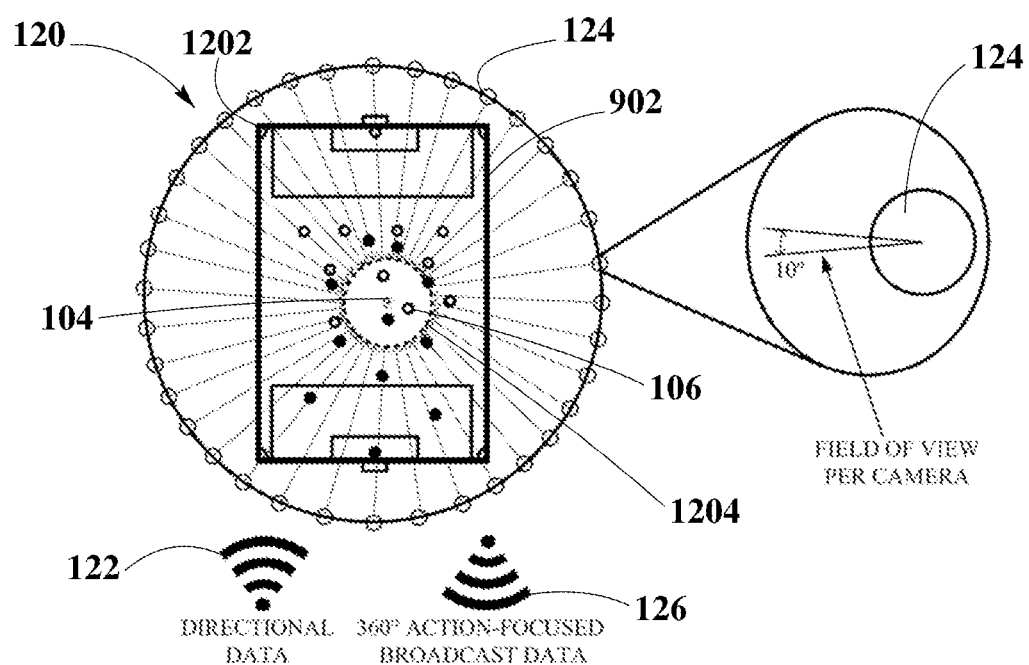
FIG. 12 illustrates a stadium camera system that may be used to generate 360 degree action-focused broadcast data, according to an embodiment.

FIG. 12 illustrates a stadium camera system 120 which may be employed to provide a high density, high quality and uniformly targeted broadcast data to the data processing server, according to an embodiment. The stadium camera system 120 may include an arrangement with a plurality of action-focused cameras 124 positioned in the area of the stadium 1202 around the sports pitch 902 and configured to record the action taking place in the sports pitch 902. Directional data 122 sent by the data processing server serve as instructions for the stadium camera system 120 to control the rotation, focus, and zoom of each of the action-focused cameras 124 in order to capture the action taking place in the sports pitch 902. In some embodiments, the action-focused cameras 124 include one or more LIDAR devices mounted thereon. The LIDAR devices may provide precise distance and depth information of action taking place in the sports pitch 902. Data obtained from the LIDAR devices may be included in the 360 degree action-focused broadcast data 126 that is sent back to the data processing server for further processing.

In FIG. 12, where a circular stadium 1202 is employed to illustrate the stadium camera system 120, 36 action-focused cameras 124 are configured to follow the action in the sports pitch 902. Each of the 36 action-focused cameras 124 may be used to cover at least 10 degrees of field of view, adding up to 360 degrees broadcast coverage. However, a greater or lower number of action-focused cameras 124 may as well be employed, with respective compensations in field of view coverage required. Additionally, other shapes apart from circular shapes may be used for the stadium 1202, including oval shapes, rectangular shapes, squared shapes, pentagonal shapes, and the like.

According to an embodiment, the stadium camera system 120 is configured to capture a spherical focus zone 1204, which includes the area within the sports field where the most relevant action of the sports event takes place. Diameter of the spherical focus zone 1204 may depend on the initial configuration of the stadium camera system 120. This configuration may depend on different sports event priorities. In an embodiment, a stadium camera system 120 configured for a smaller spherical focus zone 1204 may be based on focusing on an area within about 2 to 10 meters around the sports ball 104. In another embodiment, a stadium camera system 120 configured for a larger spherical focus zone 1204 may be based on focusing on an area within about 10 and about 50 meters around the sports ball 104 when taking into account individual players 106 located relatively close to the action.

According to another embodiment, the spherical focus zone 1204 may be static or dynamic. For a static spherical focus zone 1204, diameter of the spherical focus zone 1204 may be fixed, meaning that the focus of the stadium camera system 120 may, independently of the type of action taking place, always be on the action taking place within about 2 to 10 meters around the sports ball 104, or within about 10 to 50 meters around the sports ball 104 when taking into account individual players 106 located relatively close to the action. On the other hand, for a dynamic spherical focus zone 1204, the spherical focus zone 1204 may increase or decrease in diameter depending on the action taking place. For example, in the case of a soccer match, a goal kick or a free kick may trigger an expansion of the spherical focus zone 1204, while a penalty kick may trigger a contraction of the spherical focus zone 1204.

According to an embodiment, stadium camera system 120 may be configured to compensate and modify the rotation, focus, and zoom of each of the action-focused cameras 124 depending on where the spherical focus zone 1204 is located with respect to the action-focused cameras 124. Compensation and modification of the rotation, focus, and zoom of each of the action-focused cameras 124 is performed in order to obtain highly uniform 360 degree action-focused broadcast data 126 to be sent back to the data processing server. In this embodiment, each of the action-focused cameras 124 may, at any specific moment in time, record the action within the spherical focus zone 1204 employing different levels of rotation, focus, and zoom. For example, if the spherical focus zone 1204 is located close to a specific group of action-focused cameras 124, the zoom and focus parameters from each of these action-focused cameras 124 may be lower than the zoom and focus parameters from action-focused cameras 124 located farther away from the spherical focus zone 1204. Likewise, when the spherical focus zone 1204 moves away from the specific group of action-focused cameras 124 initially located close to the spherical focus zone 1204, then the zoom and focus parameters from each of these action-focused cameras 124 may be higher than before. Rotation of the action-focused cameras 124 may as well be dependent on the location of the spherical focus zone 1204. In order to perform the compensation and modification of the rotation, zoom, and focus parameters, the distance and position between each of the action-focused cameras 124 and the spherical focus zone 1204 is measured by the data processing server and is provided to the stadium camera system 120 as a set of real-time instructions to achieve the rotation, zoom, and focus compensation. Additionally, the action-focused cameras 124 may need to be calibrated before or at the beginning of the sports event.

Figure 13A:
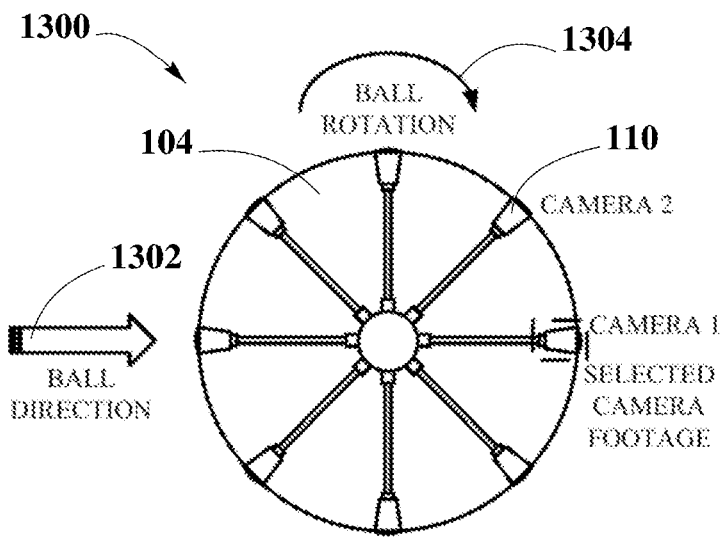
FIGS. 13A and 13B illustrate a diagram of a camera footage selection/discarding within ball space, according to an embodiment.
Figure 13B:
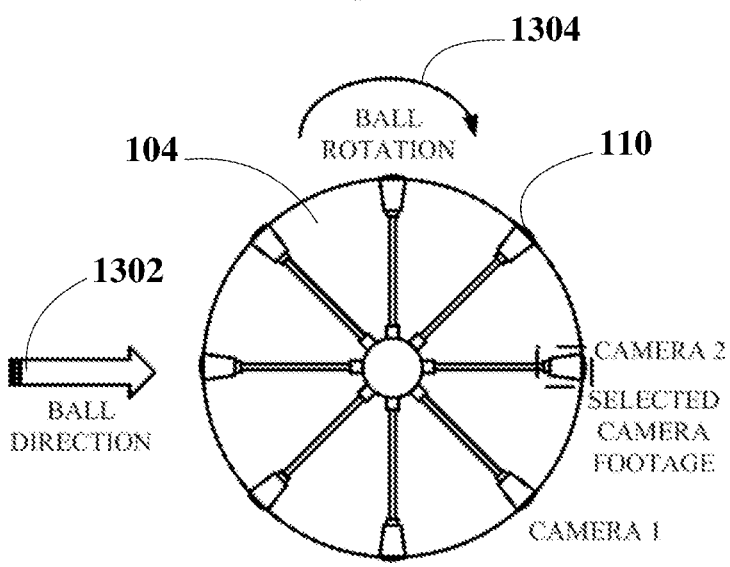

FIGS. 13A and 13B illustrate a diagram of camera footage selection/discarding within ball space 1300, which may be performed by the data processing server based on a set of camera footage selection/discarding rules, according to an embodiment. "Ball space", as used herein, refers to the space on the exterior covering a sports ball 104 wherein a plurality of image capturing devices 110 has been mounted. The camera footage selection/discarding within ball space 1300 may be performed in order to process images sent to the data processing server by each of the image capturing devices 110 via the wireless pitch data transmission grid 114, selecting only footage that may add value to a final footage to be broadcast to an audience. It is important to note that the processing performed by the data processing server is done on footage data that is already sent, or is being sent, by the image capturing devices 110 on the a sports ball 104. Based on one or more triggers, e.g., events on the sports field, the data processing server may determine which segments of footage to take from each of the one or more image capturing devices 110. Thus, the sports ball 104 may continue rotating or moving to different places of the sports field while recording new footage without interrupting the processing performed by the processing server 104.

The set of rules upon which the camera footage selection/discarding within ball space 1300 is based may be more easily applied after a real ball direction has been determined (e.g., by the method for determining a real ball direction in world space 1002 described with reference to FIG. 11 or any other suitable methods), allowing the data processing server to focus on a given set of camera footage relevant for broadcasting to an audience.

In FIGS. 13A and 13B, various image capturing devices 110 record footage while mounted on a sports ball 104 traveling on a direction 1302 set from left to right in world space with a clockwise rotation 1304 and send, in real-time, the footage to the processing server. Then, as shown in FIG. 13A, once sufficient camera footage to reconstruct a specific scene determined by the data processing server has been transferred to the data processing server, a camera footage selection rule may instruct the data processing server to select footage from Camera 1 when complying with that camera footage selection rule, whereas footage from Camera 2 may be discarded for including images compliant with a camera footage discarding rule. Then, as shown in FIG. 13B, after the image that Camera 1 was capturing is not compliant with the camera footage selection rule, and thus complies with a camera footage discarding rule, footage from Camera 1 may be discarded and footage from Camera 2 may then be added to the processed footage compilation.

According to an embodiment, footage may be selected from one image capturing device 110 within the ball space for a given set of video frames.

According to yet another embodiment, different footage recorded simultaneously by more than one image capturing device 110 from different locations and angles within the ball space may be selected for a given set of video frames. Recording footage from more than one image capturing device 110 for a given set of frames may provide a video control operator (not shown) with a greater number of sets of possible processed footage to select and broadcast to an audience.

Figure 14:
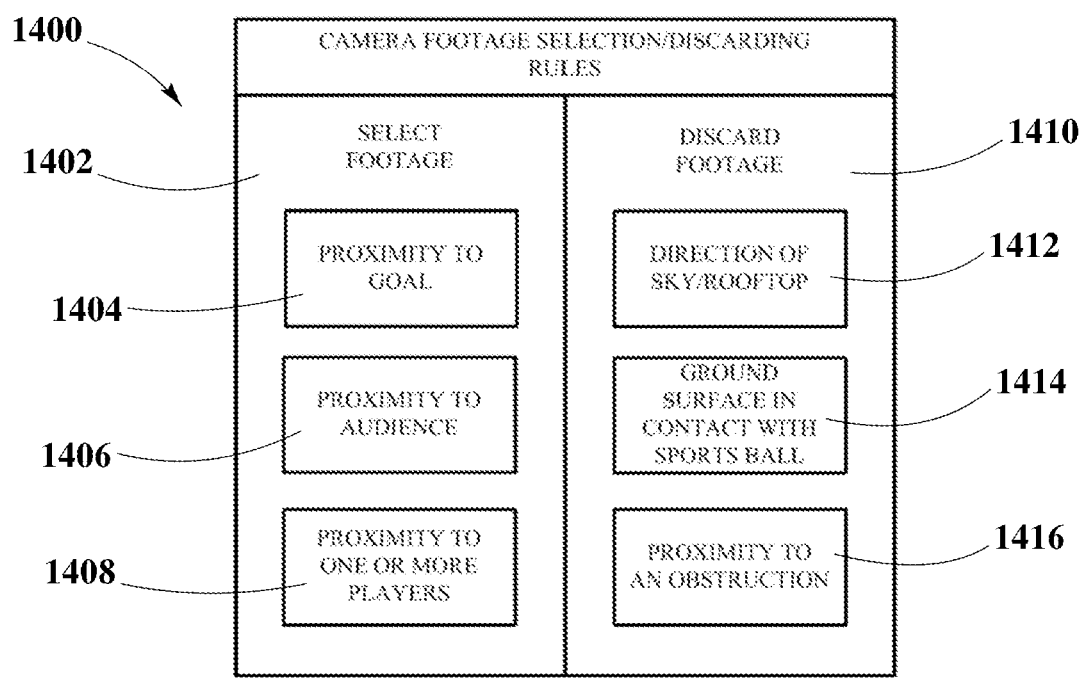
FIG. 14 illustrates a sample set of camera footage selection/discarding rules using a soccer ball as an example, according to an embodiment.

FIG. 14 illustrates a sample set of camera footage selection/discarding rules 1400 which may be performed by the data processing server, according to an embodiment. In FIG. 14, camera footage selection/discarding rules 1400 is illustrated by using a soccer ball as an example. However, it may be understood that the camera footage selection/discarding rules may differ depending on the sports or activity taking place within a stadium. Accordingly, a set of camera footage selection rules 1402 may include selecting camera footage from image capturing devices when the soccer ball is in:

proximity to a goal 1404, whenever the soccer ball is located relatively close to the goal;

proximity to an audience 1406, whenever the soccer ball has deviated from its course and gone out of the soccer pitch towards the audience 1406; and, proximity to one or more players 1408, whenever the trajectory of the soccer ball is directed towards the one or more players.

As may be noted, camera footage selection rules 1402 may ensure that only footage from image capturing devices recording relevant images is taken into consideration for final video broadcasting.

The processed data obtained after analysis and processing of raw data may be used for reconstructing specific scenes (e.g., for providing a replay of a penalty shootout, a sequence related to a referee's ruling, etc.) that can then be broadcast on a display or other viewing means for enjoyment of an audience.

Likewise, a set of camera footage discarding rules 1410 may also be considered. The set of camera footage discarding rules 1410 may include discarding camera footage from image capturing devices that are directed towards:

the sky/rooftop 1412;

the ground surface in direct contact with the sports ball 1414; and, an obstruction 1416 such as an advertising board in close proximity to the soccer ball.

As may be appreciated, camera footage discarding rules 1410 work based on eliminating images that may not provide any value to an audience.

Figure 15:
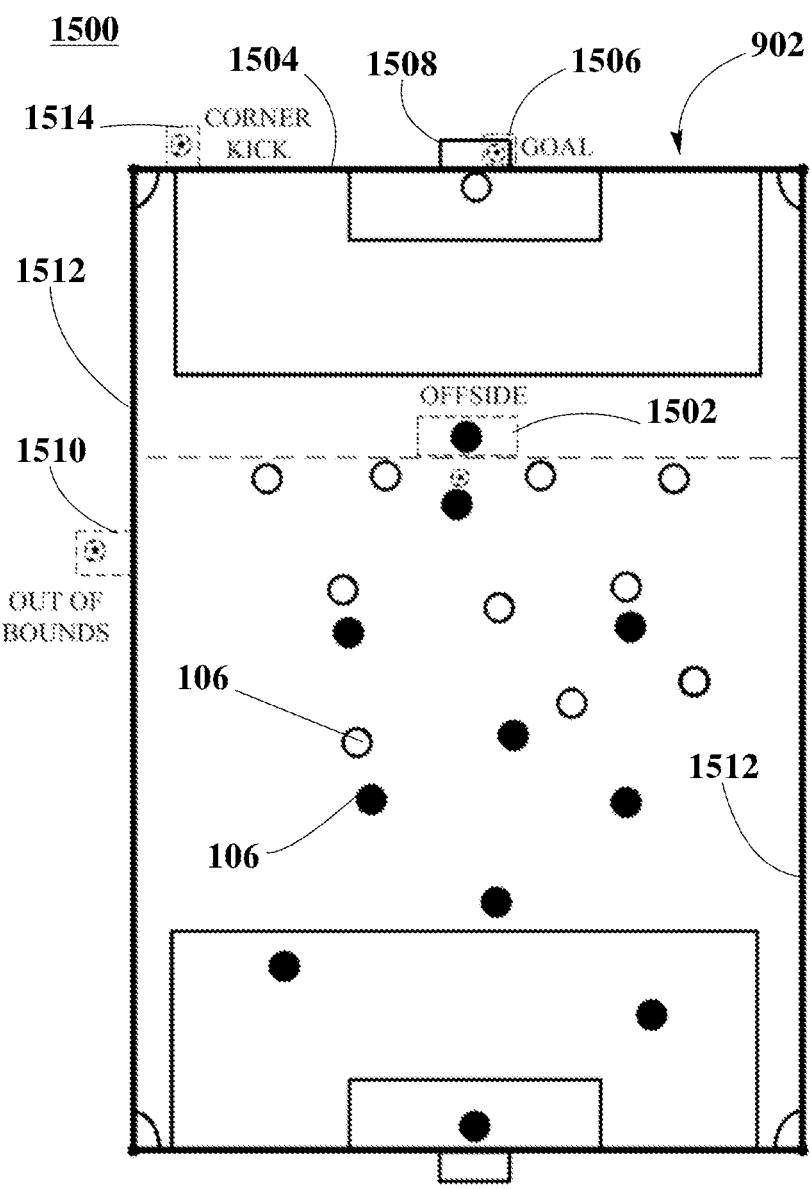
FIG. 15 illustrates a sample set of data broadcasting rules, according to an embodiment.

FIG. 15 illustrates a sample set of data-broadcast triggering rules 1500 that may trigger data broadcasting by the data processing server in the form of a replay. In the current disclosure, a replay refers to a reconstructed scene based on raw footage obtained from image recording devices mounted in a sports ball, sports equipment on players, or stadium cameras, to be broadcast to an audience. Thus, the data-broadcast triggering rules 1500 trigger the data processing server to select and process specific parts of the received footage in order to reconstruct the scene in the form of a replay. In FIG. 15, different scenarios are depicted that may serve as data-broadcast triggering rules 1500 in the sample case of a soccer match. However, other data-broadcast triggering rules 1500 may be used to trigger data broadcasting when using the broadcasting system in other types of sports or entertainment events taking place in a stadium. It is to be noted that only one of the scenarios depicted in FIG. 15 may occur at a single moment in time.

Whenever an event triggers data-broadcast triggering rule 1500, the data processing server 118 receives a signal from the sports ball or sports equipment through the wireless pitch data transmission grid with instructions to process and broadcast data-broadcast triggering event.

Examples of data-broadcast triggering rules 1500, as shown in FIG. 15, include:
- offside 1502, which occurs when an individual player 106 is in the opposing team's half of the sports pitch 902 and is also nearer to the opponent goal line 1504 than both the soccer ball and the closest opponent. For an offside data-broadcast triggering rule 1500 to trigger data broadcasting, geo-location data, emitted by the sensor module of the sports equipment worn by the individual player in offside 1502 position, is gathered and checked against the geo-location data from other individual players within the sports pitch 902;
- goal 1506, which occurs when the soccer ball has passed completely over the goal line 1504 between the goal posts 1508. For a goal data-broadcast triggering rule 1500 to trigger data broadcasting, geo-location data, emitted by the sensor module of the soccer ball, is gathered and checked against the position of the goal line 1504 between the goal posts 1508;
- out of bounds 1510, which occurs when the soccer ball has passed completely over the lateral boundaries 1512 of the sports pitch 902. For an out of bounds data-broadcast triggering rule 1500 to trigger data broadcasting, geo-location data, emitted by the sensor module of the soccer ball, is gathered and checked against the position of the lateral boundaries 1512 of the sports pitch 902; and,
- corner kick 1514, which occurs when the soccer ball has crossed the goal line 1504 without a goal 1506 having been scored, and having been last touched by a defending player. For a corner kick 1514 to trigger data broadcasting, geo-location data, emitted by the sensor module of the soccer ball, is gathered and checked against the position of the goal line 1504 taking into account whether the last player to have had contact with the ball was a defending or attacking individual player 106.

As may be appreciated, in general, data-broadcast triggering rules 1500 are based on and connected to events that are specific to the rules of the sports event being watched.

Figure 16:
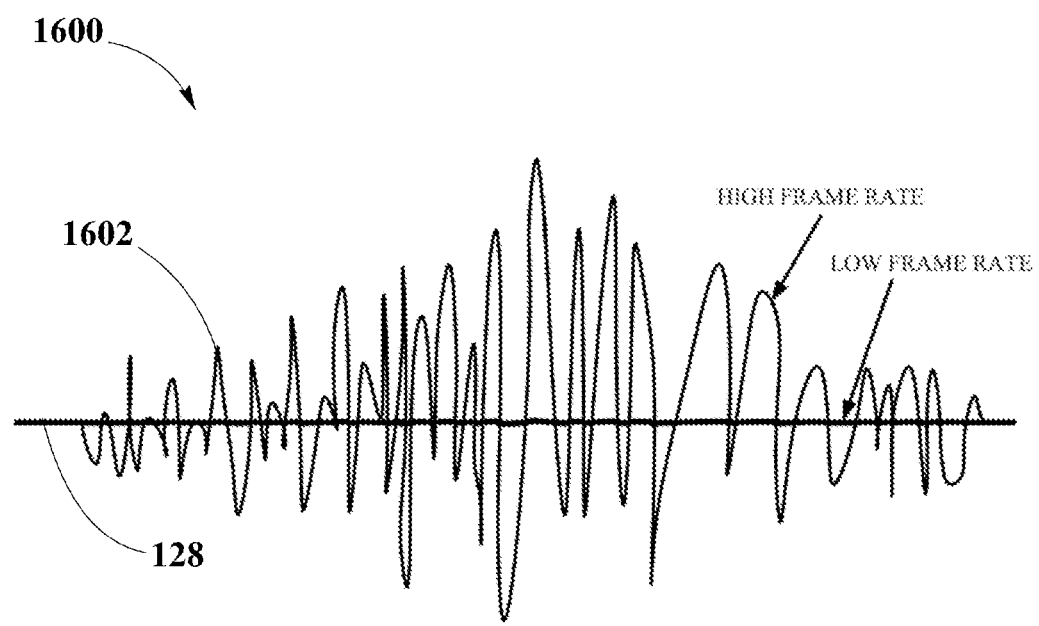
FIG. 16 illustrates a diagram of video footage synthesizing/filtering, according to an embodiment.

FIG. 16 illustrates a diagram of video footage synthesizing/filtering 1600, according to an embodiment. In FIG. 16, raw video footage 1602 received from the plurality of image capturing devices 110 mounted in the sports ball and/or from the image capturing devices on the sports equipment, is received at a high frame rate of at least 100 FPS. This raw video footage 1602, after being synthesized/filtered by implementation of camera footage selection/discarding rules (e.g., camera footage selection/discarding rules 1400 of FIG. 14), data broadcasting rules, video noise filtering methods, and other suitable video processing techniques, produces a processed data 128 at a low frame rate of at least 24 FPS.

According to various embodiments, produced processed data 128 may be selected from the perspective of the sports ball, from the perspective of individual players, from a 360 degree action-focused view obtained from the stadium camera system, or from combinations thereof. For example a broadcast replay of a penalty shootout may include a few seconds of footage from the perspective of a soccer ball, a few seconds from the perspective of the individual player kicking the penalty, a few seconds from the perspective of the goalkeeper in an attempt to save the soccer ball, and a few seconds from the perspective obtained by the stadium camera system.

Figure 17:
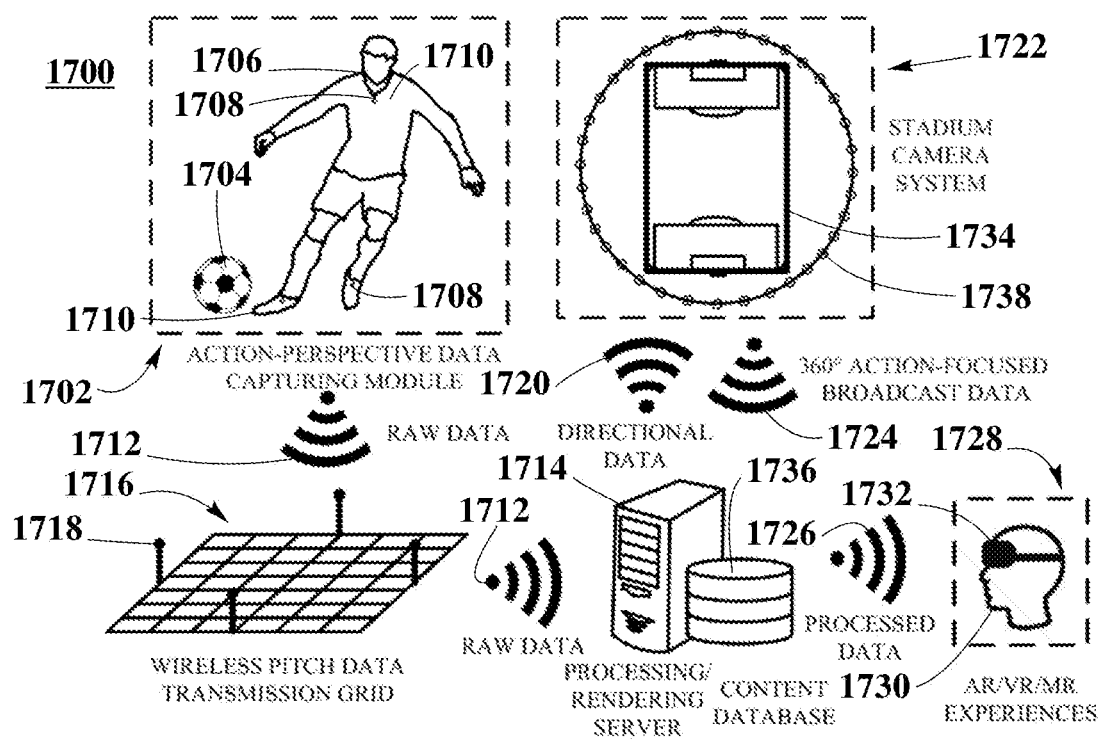
FIG. 17 illustrates applications of the broadcasting system being employed for interactions with a user through virtual reality and/or augmented reality, according to an embodiment.

FIG. 17 illustrates AR/VR/MR broadcasting system 1700 for providing various experiences to a user, such as a member of an audience, according to an embodiment.

In the embodiment of a AR/VR/MR broadcasting system 1700, an action perspective data capturing module 1702 includes a sports ball 1704 and one or more individual players 1706 with image capturing devices 1708 mounted upon their sports equipment 1710 and configured to capture and transmit raw data 1712, such as raw video footage and telemetry metadata, for subsequent analysis and processing. The raw data 1712 is transmitted to a processing/rendering server 1714 after being uploaded to the wireless pitch data transmission grid 1716 and/or antennas 1718. At this stage, the processing/rendering server 1714 analyzes and processes the raw data 1712 received and generates directional data 1720 that is then sent to the stadium camera system 1722 comprising a plurality of action-focused cameras that, based on directional data sent by the data processing server, auto-compensate and regulate rotation, focus, and zoom of cameras in order to generate uniform action coverage covering 360 degrees field of view around a spherical focus zone determined by the location of the sports ball, individual players, or combinations thereof to create 360 degree action-focused broadcast data 1724 that is sent back to the processing/rendering server 1714.

Then, the processing/rendering server 1714, applying data-broadcast triggering rules, noise filtering methods, and other video processing and rendering techniques, processes the raw data 1712 and 360 degree action-focused broadcast data 1724 into processed data 1726 to create context-full scenarios. These context-full scenarios may be used for generating AR/VR/MR experiences 1728 for enjoyment of users 1730 such as members of an audience through suitable user devices, such as AR/VR/MR headsets 1732.

According to an embodiment, in the case of AR/VR/MR experiences 1728 with individual players 1706, the AR/VR/MR broadcasting system 1700 may be employed not only to train athletic skills of said individual players 1706 but also to provide psychological conditioning, such as mentally preparing one or more individual players 1706 for a penalty shootout. Through the AR/VR/MR broadcasting system 1700, the processing/rendering server 1714 may recreate scenarios from previous matches, serving as a personalized training program that may be used in a virtual reality/augmented reality training center.

According to another embodiment, in the case of AR/VR/MR experiences 1728 provided to members of an audience, the AR/VR/MR broadcasting system 1700 may allow members of an audience to view and experience the broadcast of a replay from the perspective of one or more individual players 1706 and/or from the perspective of a sports ball 1704.

According to another embodiment, the processing/rendering server 1714 is able to create augmented reality volumes that users 1730, such as members of an audience, may interact with to enjoy further AR/VR/MR experiences 1728. These interactive augmented reality volumes may be created by distance interpolation methods applied on the sports equipment 1710 to calculate the height and shape of an individual player 1706. In this embodiment, a content database 1736 includes information from all of the individual players 1706 as well as from the sports pitch 1734. Forms of AR interactions with individual players 1706 may include viewing player statistics, highlights, biography, and the like.

Forms of AR interactions with the sports pitch 1734 may include viewing further details about the sports pitch 1734 and stadium, including history, dimensions and capacity, statistics, highlights, and the like. Forms of AR interactions with the sports ball 104 may include current sports ball 104 locomotion data such as ball speed, ball spin rate, ball spin axis, and ball launch angle data, amongst others. In further embodiments, initial AR interactions may as well include options that lead to VR/MR interactions, such as being able to view, through AR/VR/MR headsets 1732, the sports event from the perspective of one or more individual players 1706 by utilizing data captured by the image capturing devices 1708 on the one or more individual players 1706.

According to another embodiment, compensation and modification of the rotation, focus, and zoom of each action-focused camera 1738 within the stadium camera system 1722 generates 360 degree action-focused broadcast data 1724 that the processing/rendering server 1714 processes and renders in order to create 360 degree AR/VR/MR experiences 1728 around the action taking place in the sports pitch 1734 that may be viewed by users 1730 through AR/VR/MR headsets 1732. Yet further in this embodiment, the 360 degree AR/VR/MR experiences 1728 may also be shared with one or more remote sports stadiums through a cloud server in order to simulate the action of the sports event taking place in the original stadium into the one or more remote stadiums. For AR/VR/MR experiences 1728 to be shared between stadiums, the sports pitch 1734 of the one or more target remote stadiums may be mapped against the sports pitch 1734 of the original stadium and overlay against the processed data 1726, providing users 1730 with a sensation that may be similar to being present at the original stadium.

A system and method for providing augmented reality through a simulation engine is disclosed in the U.S. Pre-Grant Publication No. 2013/0218542 filed on Nov. 29, 2012 by the same inventor of the current disclosure, and is herein incorporated by reference. Moreover, U.S. Pre-Grant Publication No. 2013/0215229 and filed on Aug. 22, 2013 by the same inventor of the current disclosure discloses a system and method for creating a virtual reality environment based on the recording of a real scene, and is herein also incorporated by reference.

The subject matter of this application is also related to the subject matter of U.S. Pre-Grant Patent Publication No. 2015/0328516 A1 entitled "Sports Ball Athletic Activity Monitoring Methods and Systems," filed on May 14, 2014. That application, including Appendices, is herein incorporated by reference.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system for recording and broadcasting during an athletic activity, the system comprising:
   one or more image capturing devices mounted within the sports ball and recording raw video footage from the perspective of said sports ball;
   a sensor module mounted within the sports ball for receiving the raw video footage of said sports ball, generating telemetry metadata of said sports ball, and wirelessly transmitting data;
   one or more image capturing devices mounted on sports equipment wearable by individual players for providing compensatory raw video data for processed video footage;
   a wireless transceiver hub communicatively connected to said sports ball and image capturing devices on the sports equipment worn by individual players to receive data for upload to a data processing server for subsequent processing and broadcasting;
   a data processing server communicatively connected to the wireless transceiver hub for processing uploaded data and producing directional data that is sent to a stadium camera system; and
   a stadium camera system communicatively connected to the data processing server that uses said directional data sent by said data processing server to obtain real-time 360 degree action-focused broadcast data that is sent back to the data processing server, the stadium camera system comprising a plurality of action-focused cameras that, based on the directional data, generate action coverage covering 360 degrees field of view around a spherical focus zone determined by the location of the sports ball, the location of one or more individual players, or a combination thereof, wherein the spherical focus zone comprises a dynamic spherical focus zone having a variable diameter that increases or decreases depending on the action taking place;
   wherein the data processing server applies camera footage selection and discarding rules and data-broadcasting triggering rules, to synthesize and filter the received footage from the sports ball, individual players and stadium camera system and reconstruct scenes for broadcasting to an audience.

2. The system of claim 1, wherein the wireless transceiver hub comprises a wireless sports pitch transmission grid, transceivers located around a sports pitch, or a combination of a transmission grid and transceivers located around the sports pitch, and wherein the wireless transceiver hub comprises mmW-based communication systems, a combination of mmW-based and sub 6 GHz-based communication systems, or wireless local area networking (WiFi) systems.

3. The system of claim 1, wherein said plurality of action-focused cameras auto-compensate and regulate rotation, focus, and zoom.

4. The system of claim 3, wherein the stadium camera system further comprises Light Detection and Ranging (LIDAR) devices configured to provide precise distance and depth information of action taking place in said sports pitch.

5. The system of claim 3, wherein the stadium camera system further includes electroacoustic transducers, including microphones and loudspeakers, respectively configured to record and reproduce sound data originating from the action taking place on said sports pitch.

6. The system of claim 1, wherein processed footage for broadcasting includes image data, 3D geometries, video data, textual data, haptic data, audio data, or a combination thereof.

7. The system of claim 1, wherein one or more layers of soft polymer material are mounted on top of camera lenses of the image capturing devices for providing damage and impact protection to said camera lenses.

8. The system of claim 1, wherein the sensor module further comprises:
an Inertia Measuring Unit (IMU);
one or more millimeter wave (mmW) transceivers;
a memory;
a power source; and
a processor.

9. The system of claim 8, wherein said IMU measures and reports velocity, acceleration, and angular momentum of said sports ball using a combination of one or more accelerometers and one or more gyroscopes.

10. The system of claim 9, wherein said one or more gyroscopes are configured to maintain rotation of the sensor module independent of rotation of the sports ball.

11. The system of claim 8, wherein said one or more mmW transceivers enable positional tracking of the sports ball.

12. The system of claim 8, wherein said one or more mmW transceivers are configured to allow the sports ball to upload raw data to the data processing server via the wireless transceiver hub, said raw data comprising:
raw video footage captured from the perspective of the sports ball; and
the telemetry metadata of the sports ball.

13. The system of claim 8, wherein said memory is adapted to store data comprising:
application program instructions;
the telemetry metadata of the sports ball; and
raw video footage taken by the plurality of image capturing devices mounted in the sports ball.

14. A method for processing and synthesizing video footage performed by a data processing server, the method comprising:
obtaining raw video data from image capturing devices mounted in a sports ball and on individual players along with telemetry metadata, wherein at least one image capturing device mounted in the sports ball is configured to capture raw video data from the perspective of the sports ball;
determining a real ball direction within world space;
sending directional data to a stadium camera system that, based on the directional data, auto-compensates and regulates rotation, focus, and zoom of cameras in order to generate uniform action coverage covering 360 degrees field of view around a spherical focus zone determined by the location of the sports ball, the location of one or more individual players, or combinations thereof, wherein the spherical focus zone comprises a dynamic spherical focus zone having a variable diameter that increases or decreases depending on the action taking place;
obtaining 360 degree action-focused broadcast data from the stadium camera system;
applying camera footage selection/discarding rules;
applying data-broadcast triggering rules; and
processing raw data received from the sports ball, sports equipment of individual players and the 360 degree action-focused broadcast data to reconstruct scenes for broadcasting to an audience.

15. The method of claim 14, wherein determining a real ball direction within world space further comprises:
detecting a movement of the sports ball;
determining an initial spatial orientation of the sports ball;
determining a change in the spatial orientation of the sports ball;
determining telemetry metadata of the sports ball; and
utilizing the telemetry metadata in conjunction with high speed video footage, initial spatial orientation, and changes in spatial orientation of the sports ball for obtaining the real ball direction in world space.

16. The method of claim 14, wherein camera footage selection/discarding rules include:
rules for selecting footage from cameras recording images to add to a final video footage to be broadcast to an audience; and
rules for discarding footage from cameras recording images to omit from a final video footage to be broadcast to an audience.

17. The method of claim 16, wherein footage may be selected from one camera within ball space for a given set of video frames.

18. The method of claim 16, wherein more than one set of footage recorded simultaneously by more than one camera from different locations and angles within ball space may be selected for a given set of video frames.

19. A system comprising:
a sensor module mounted within a sports ball for generating telemetry metadata of said sports ball and wirelessly transmitting data;
one or more image capturing devices mounted on sports equipment wearable by individual players for providing raw video data for processed video footage;
a wireless transceiver hub communicatively connected to the sports ball and image capturing devices on the sports equipment worn by individual players to receive data for upload for subsequent processing and broadcasting;
a data processing server communicatively connected to the wireless transceiver hub for processing uploaded data and producing directional data; and
a stadium camera system communicatively connected to the data processing server that uses said directional data to obtain real-time 360 degree action-focused broadcast data that is sent back to the data processing server, the stadium camera system comprising a plurality of action-focused cameras that, based on directional data sent by the data processing server, auto-compensate and regulate rotation, focus, and zoom of cameras in order to generate action coverage covering 360 degrees field of view around a spherical focus zone determined by the location of the sports ball, individual players, or combinations thereof, wherein the spherical focus zone comprises a dynamic spherical focus zone having a variable diameter that increases or decreases depending on the action taking place;
wherein the data processing server applies camera footage selection and discarding rules and data-broadcasting triggering rules to process received footage from the image capturing devices mounted on sports equipment wearable by individual players and the stadium camera system to generate experiences in augmented, virtual or mixed reality for interaction with users via user devices.

20. The system of claim 19, wherein the augmented, virtual or mixed reality experiences based on the events of a stadium are shared with one or more cloud servers to simulate and broadcast the sports event to at least one other stadium.

* * * * *